United States Patent
Chen et al.

(10) Patent No.: US 8,046,373 B2
(45) Date of Patent: Oct. 25, 2011

(54) STRUCTURED PARALLEL DATA INTENSIVE COMPUTING

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 12/359,324

(22) Filed: Jan. 25, 2009

(65) Prior Publication Data
US 2010/0191716 A1    Jul. 29, 2010

(51) Int. Cl.
*G06F 17/30* (2006.01)

(52) U.S. Cl. ........ 707/757; 707/713; 707/759; 707/760; 707/809

(58) Field of Classification Search .................. 707/713, 707/809, 760, 759, 757
See application file for complete search history.

(56) References Cited

U.S. PATENT DOCUMENTS

| | | | |
|---|---|---|---|
| 5,930,795 A * | 7/1999 | Chen et al. ............................ | 1/1 |
| 7,606,792 B2 * | 10/2009 | Cunningham et al. ................ | 1/1 |
| 7,797,304 B2 * | 9/2010 | Muralidhar et al. .......... | 707/713 |
| 7,853,603 B2 * | 12/2010 | Churin et al. ................. | 707/755 |
| 7,885,968 B1 * | 2/2011 | Hamamatsu et al. ......... | 707/760 |
| 2005/0209988 A1 * | 9/2005 | Cunningham et al. ............ | 707/1 |
| 2008/0294620 A1 * | 11/2008 | Churin et al. ..................... | 707/5 |
| 2009/0319501 A1 * | 12/2009 | Goldstein et al. ................. | 707/4 |
| 2010/0191716 A1 * | 7/2010 | Chen et al. ..................... | 707/713 |
| 2010/0250572 A1 * | 9/2010 | Chen et al. ..................... | 707/759 |
| 2010/0306720 A1 * | 12/2010 | Pikus et al. ....................... | 716/5 |

* cited by examiner

*Primary Examiner* — Jean M Corrielus

(57) ABSTRACT

Methods, systems, and computer program products are provided for performing structured parallel data intensive computations. A SQL-FCF framework that defines a SQL construct based interface for performing the computations is provided. The computations within an application are coded as table valued functions (TVFs). Data for the application is partitioned into data partitions to co-locate and load balance the data partitions and corresponding computations. The TVFs are invoked and applied to corresponding ones of the data partitions in a structured order defined by function control forms (FCF).

18 Claims, 7 Drawing Sheets

340

Function PostorderAnalysis (t)
Input: Tree t
Output: watershed current/predicted status
Procedure
1: if t = ø then
2:    return
3: for each i
4:    PostorderAnalysis (t.child(i))
5: WatershedAnalysis (t)

350

Function (postorder f) (t)
Input: Tree t
Output: watershed current/predicted status
Procedure
1: if t = ø then
2:    return
3: for each i
4:    (postorder f) (t.child(i))
5: f (t)

[CROSS APPLY] $\alpha f_K : R$
Procedure
1: Set S = ø
2: for each $i \in \{1,...,n\} \wedge t_i \in R$
3:    $S = S \cup f_K(t_i)$
4: return eq-join (R, S) on K

[CONNECT-APPLY] $\gamma_{\varphi,P,C,o} f_K : R$
Procedure
1: Set S = ø
2: for each row $t \in \sigma_\varphi(R)$
3:    if O == 0
// O == 0 indicates pre-order apply
// where the function is applied to
// the current row first before applied to
// its children recursively.
// Otherwise, in post-order apply,
// the order is reversed
4:    then
     //first apply to the current row t
5:      $S = S \cup f_K(t)$
     //then to child rows in $\sigma_{P=t.C}(R)$
6:      $S = S \cup \gamma_{P=t.C,P,C,o} f_K (R)$
7:    else
     //first apply to child rows
8:      $S = S \cup \gamma_{P=t.C,P,C,o} f_K (R)$
     //then to the current row t
9:      $S = S \cup f_K(t)$
10: return eq-join (R, S) on K

FIG. 4B

STRUCTURED PARALLEL DATA INTENSIVE COMPUTING

BACKGROUND OF THE INVENTION

A trend in supporting large scale information technology (IT) applications is converging data intensive computation and data management to achieve fast data access and reduced data flow. For example dynamic data warehousing and operational business intelligence (BI) applications involve large-scale data intensive computations in multiple stages from information extraction, modeling and analysis to prediction. To support such applications, two IT disciplines are often deployed: high performance computing (HPC) and scalable data warehousing, both of which are based on the use of computer cluster technology and partitioning of tasks and data for parallel processing. In such an environment, parallel execution of reusable computations in Structured Query Language (SQL) applications may be used to push-down data intensive computations to a data management layer to converge computation and data.

BRIEF DESCRIPTION OF THE DRAWINGS

Embodiments of the invention relating to both structure and method of operation may best be understood by referring to the following description and accompanying drawings:

FIG. 3B illustrates a procedure for invocating a function, according to an embodiment;

FIG. 4A illustrates procedure semantics for a CROSS APPLY primitive applied to a TVF, according to an embodiment;

FIG. 4B illustrates procedure semantics for a CONNECT APPLY primitive applied to a TVF, according to an embodiment;

DETAILED DESCRIPTION

Figure 1A:
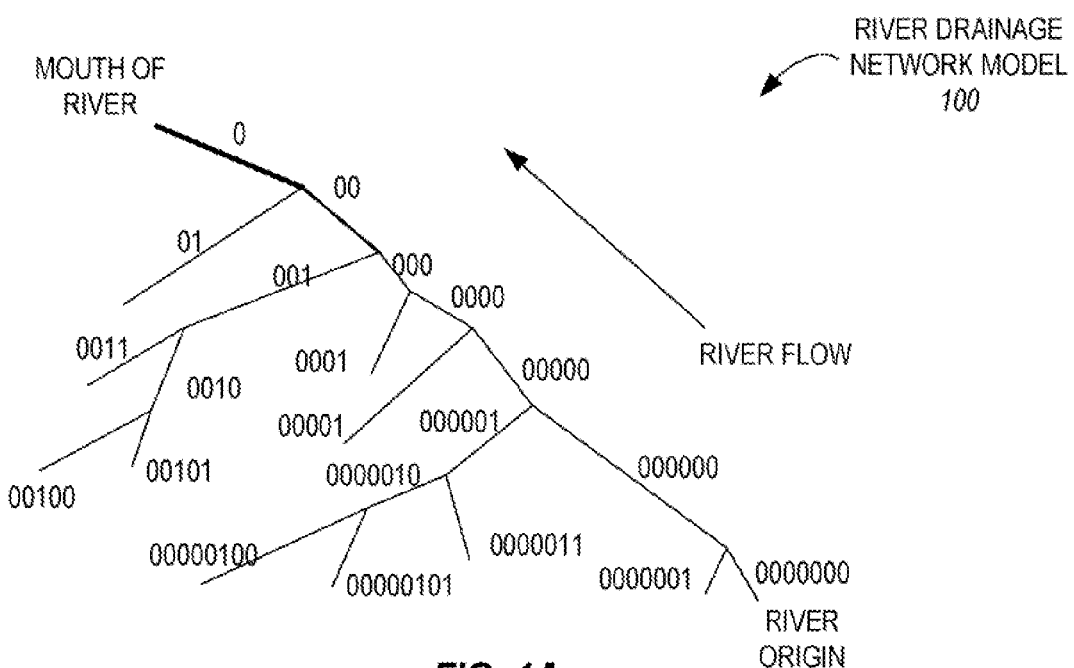
FIG. 1A illustrates a river drainage network model, according to an embodiment.

Novel features believed characteristic of the present disclosure are set forth in the appended claims. The disclosure itself, however, as well as a preferred mode of use, will best be understood by reference to the following detailed description of illustrative embodiments when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a cluster of servers may be configured to include $2**N$ servers, N being an integer.

Framework—A basic infrastructure designed to provide one or more functions. A framework used in an information technology (IT) environment may include electronic hardware, software, and services building blocks (used as platform devices) that are designed to work with each other to deliver core functions and extensible functions. The core functions are typically a portion of the framework that may selectable but not modifiable by a user. The extensible functions are typically a portion of the framework that has been explicitly designed to be customized and extended by the user as a part of the implementation process.

Model—A model can be a representation of the characteristics and behavior of a system, element, solution, application, or service. A model as described herein captures the design of a particular IT system, element, solution, application, or service. The model can include a declarative specification of the structural, functional, non-functional, and runtime characteristics of the IT system, element, solution, application, or service. The instantiation of a model creates a model instance.

Considerations in Structured Parallel Processing

Data intensive computation may be described as a technical merge of parallel computation and scalable data management. Applicants recognize that while both parallel computing and parallel data management have made significant progress with advances in cluster technology, they are often treated separately. For scientific and other computing applications, data are stored in separate repositories and brought in for computation. For databases, applications are viewed as external clients. Very often, a task and the data to be applied by it are not co-located, causing significant overhead of data flow. Such locality mismatch is often the cause of poor performance and is considered as a major performance bottleneck.

Applicants recognize that the support for parallel computing is often spread over multiple system layers, e.g., multi-core, SMP, cluster, and others. Very often, application programs need to deal with parallelism explicitly with specific task scheduling protocols such as MPI and RPC, leading to the complexity, instability, and inflexibility of programs with respect to the changes in function, data layout, and hardware infrastructure. Thus, there is need to liberate users from low-level parallel programming. One technique for lifting parallel programming interface to a higher-level is to specify computation job functionally without referencing "addresses", such as memory, CPUs, and duster nodes, thereby assigning computation parallelization task to a system layer.

Applicants further recognize that some "flat" parallel computing architectures, characterized by applying one function to multiple data objects concurrently, do not catch the order dependency of data processing. An example of an application that may be sensitive to order dependency of data processing is a hydrologic computation, in which a function is to be applied region-by-region in an appropriate order, e.g., from upstream to downstream of a river network. This order dependency may be desired since the database updates made by the data processing for upstream regions may affect the database values used for downstream regions. For data intensive computation, it would be desirable for the data partitioning technique to catch such dependencies.

Embodiments of systems and methods for performing structured parallel data intensive computations are disclosed herein that enable convergence of data intensive computation and data management for improved performance and reduced data flow. A SQL construct based framework is disclosed for interfacing data intensive computation and parallel database management at high-level, thereby liberating users from low-level parallel programming. The framework allows users to specify the order dependency of computations at a high-level, leaving the parallel computing opportunities, either static implied in the specification or dynamically appeared during the execution, interpreted and handled by the system.

The disclosure includes a section outlining an application involving watershed computation performed by a river drainage network, a section describing an example on data dependent structured parallel computation, a section describing details of a SQL construct based framework that supports specifying applications that are functionally independent of the underlying server infrastructure, and provides high-level primitives to express the control flow of applying functions to data partitions, and a section to describe implementation considerations.

Watershed Computation Performed by a River Drainage Network

Figure 1B:
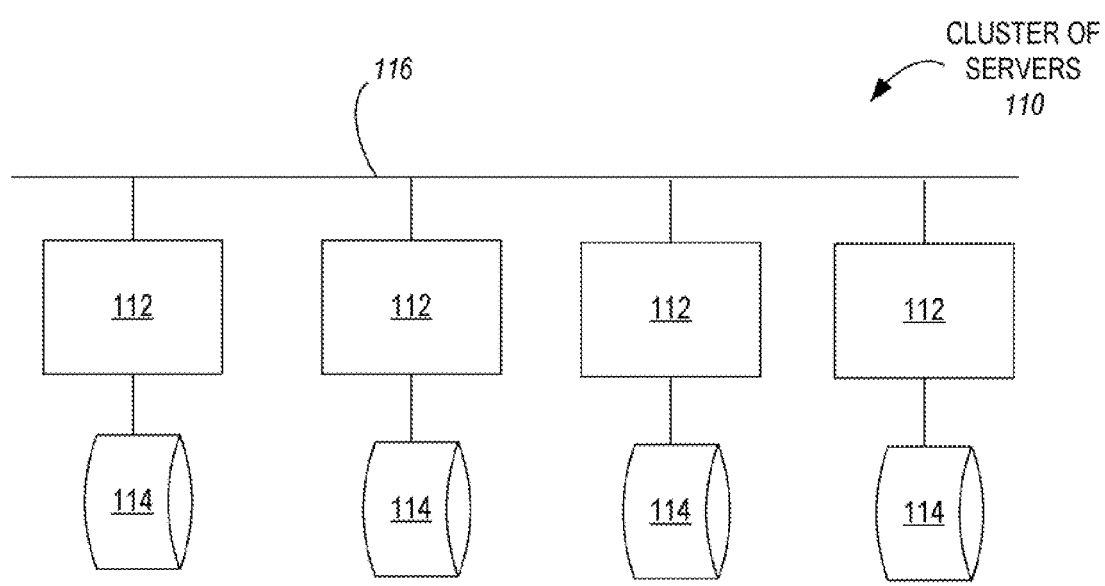
FIG. 1B illustrates a cluster of servers to implement a river drainage network model described with reference to FIG. 1A, according to an embodiment.

FIG. 1A illustrates a river drainage network model 100, according to an embodiment. FIG. 1B illustrates a cluster of servers 110 to implement the river drainage network model 100 described with reference to FIG. 1A, according to an embodiment. Referring to FIGS. 1A and 1B, the river drainage network model 100 is a hydro-informatics system (HIS) that includes one or more servers 112 (also referred to as computational devices or computational servers) coupled by a communication network 116 to carry out a class of space-time oriented data intensive hydrologic computations that are performed periodically or on demand with near-real-time response (e.g., responsive in a time frame that is soon enough to take a corrective action). The HIS, like many other earth information systems, may be implemented as a cluster technology based HPC system. Additional details of the implementation aspects of a cluster technology based HPC system architecture is described with reference to FIG. 6.

Referring back to FIGS. 1A and 1B, the river drainage network model 100 collects data (such as rainfall, water level, flow rate, discharge volume, and others) from various inputs. The data, which may be stored in a database 114, is referred to as the original data. Computation results, which may utilize the data, may be stored in the same underlying databases to be retrieved for analysis, mash-up and visualization. The locality match of parallel computing and parallel data management is desirable to improve the efficiency of such data intensive computation.

The majority of data stored in the river drainage network model 100 are location sensitive geographic information. The river drainage network model 100 may be illustrated as an unbalanced binary tree, where river segments are named by binary string codification. For example, starting downstream at a mouth of a river is binary segment 0 and ending upstream at an origin of the river is binary segment 0000000, thereby indicating there are 7 river segments between the mouth of the river and the origin of the river. A tributary nearest to the mouth of the river is shown as binary segment 01.

Data describing the river segments binary tree may be stored in a table, where each row represents a river segment, or a tree node. For example, a table storing the binary tree representing the river drainage network model 100 includes 21 rows for the 21 binary segments. It is understood that the number of river segments may vary depending on each application. Among other data, the table may include attributes such as node_id, left_child_id, right_child_id, node_type (e.g., RR if it is the root of a region; or RN otherwise), and a region_id.

Figure 2A:
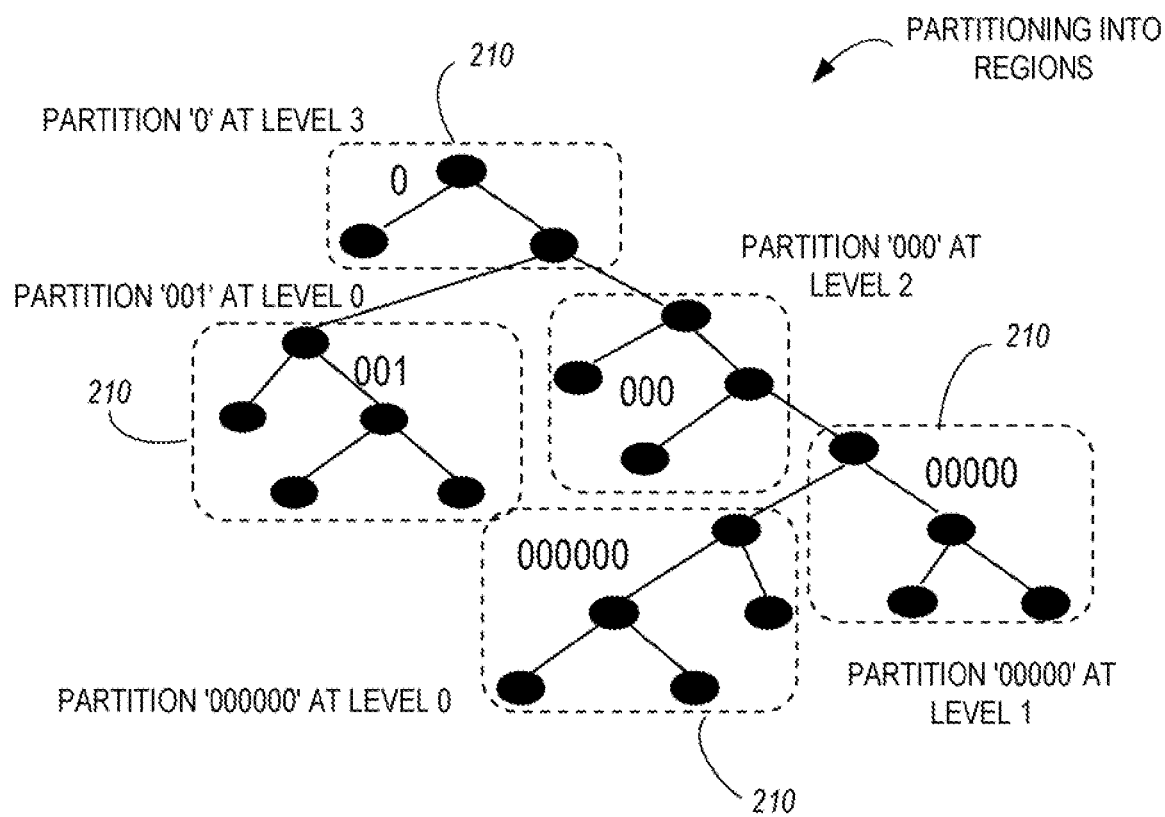
FIG. 2A illustrates a partitioning of river segments into regions, the river segments being included in a river drainage network model described with reference to FIG. 1A, according to an embodiment.

FIG. 2A illustrates a partitioning of river segments included in the river drainage network model 100 into regions, according to an embodiment. In a watershed computation application the river segments may be grouped or partitioned into regions 210 and may be processed in an order from upstream regions to downstream regions. The twenty-one (21) river segments shown in the river drainage network model 100 may be partitioned into 5 regions 210. It is understood that the number of river segments and the number of regions may vary depending on each application. Regions 210 also form a tree but not necessarily a binary tree. Each region is represented by a node in the region tree, and viewed as a partition of the river segments tree. A region has the following properties (amongst others).

region_id, that takes the value of the root node_id,
region_level, as the length of its longest descendant path counted by region, bottom-up from the leaves of the region tree, and
parent_region_id, the region_id of the parent region.

The concept of defining or configuring a region is driven by the computational needs defined by the application and the model (is application-aware and is consistent with the computational model) and the desire to co-locate data and computation to reduce data flow. The formation of a region may not be an original property or attribute of river segments.

Referring back to FIG. 2A, the river-segment table is partitioned by region across multiple server nodes 112 to be accessed in parallel. In a watershed computation, the same function may be applied, in a desired order, to multiple data partitions corresponding to the geographic regions. For example, computations being performed on a region need to retrieve the updated information of the root nodes of its child regions. The results of local executions are communicated through database access, using either permanent tables or temporary tables.

Figure 2B:
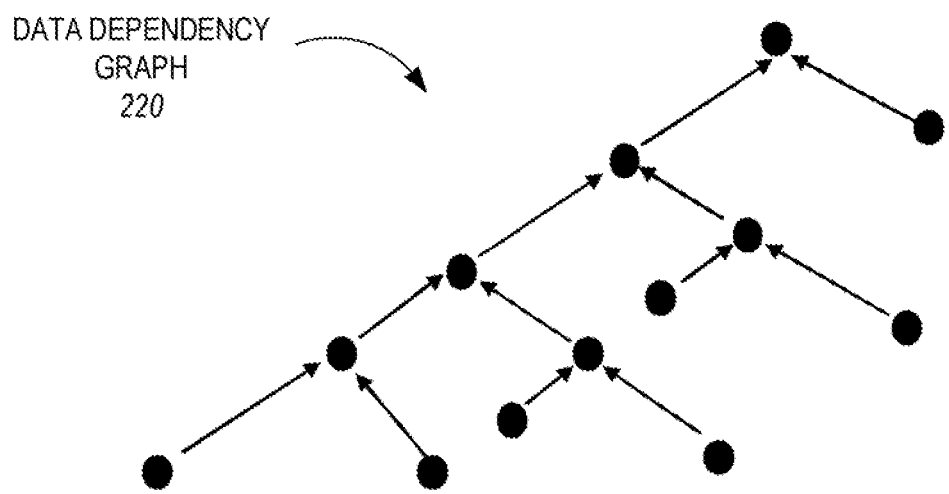
FIG. 2B illustrates a data dependency graph for defining an order of processing computations and associated data partitions, according to an embodiment.

FIG. 2B illustrates a data dependency graph 220 for defining an order of processing computations and associated data partitions, according to an embodiment. In the river drainage application, watershed computations are made in a desired sequence (or a structured order) as indicated by the data dependency graph 220, region-by-region, from upstream to downstream. Thus, from a computational viewpoint the region tree is post-order traversed, the root being computed last. The desired order in performing computation is described as the 'data dependency graph' 220 based parallel processing since geographically dependent regions 210 are desired to be processed in certain order, but the parallel processing opportunities exist for the regions 210 which can be computed in any order. For instance, regions 210 at different tree branches may be processed in parallel. The data partitioning is performed in a manner that is consistent with the data dependency graph.

Figure 2C:
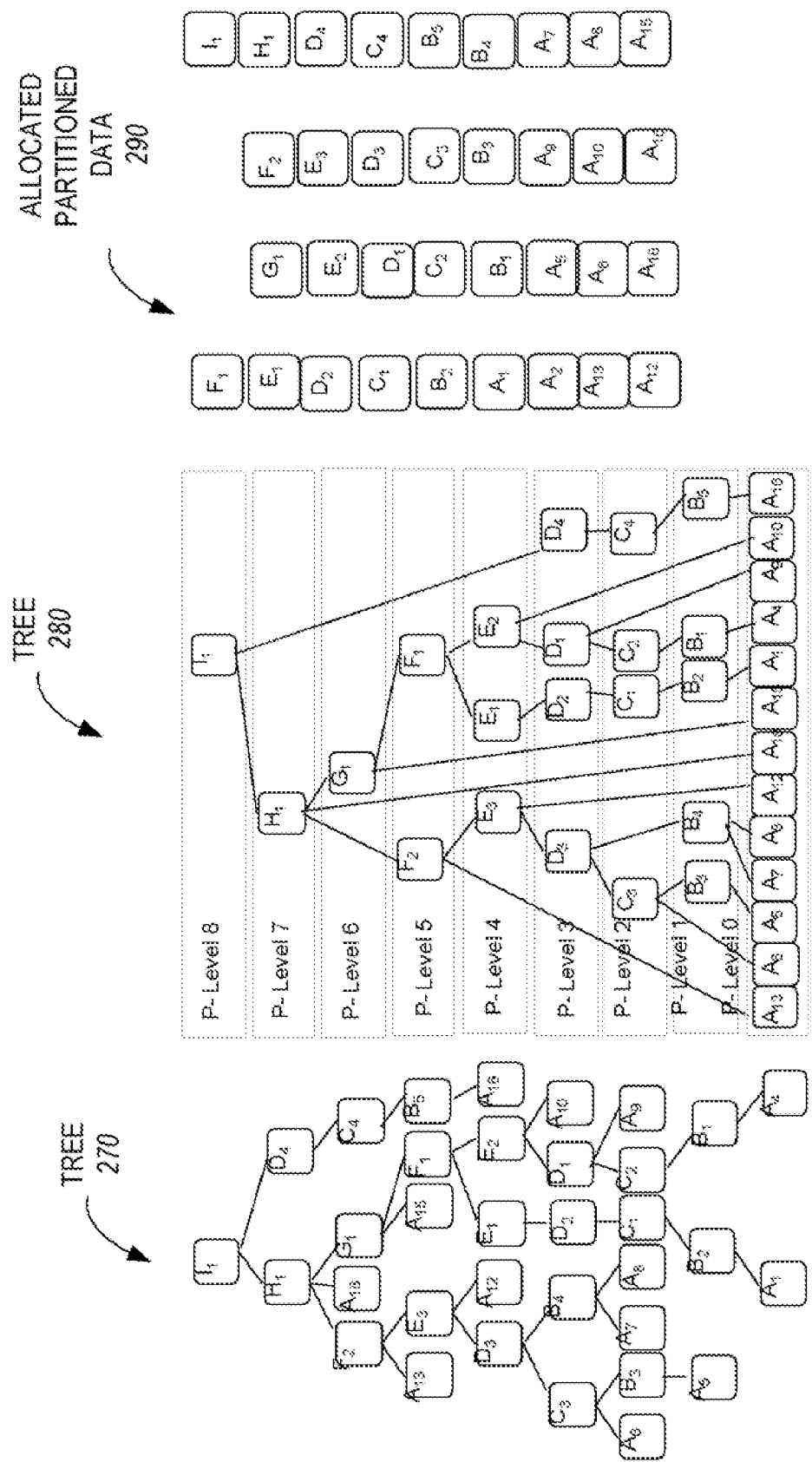
FIG. 2C illustrates a region tree with region levels in data partitioning, according to an embodiment.

FIG. 2C illustrates a region tree with region levels in data partitioning, according to an embodiment. The river segments (included in the regions table included in the original data) are partitioned into data partitions corresponding to the regions 210. Regions 210 form a tree 270. Counted from the leaves of the region tree and in the bottom-up order, each region has a region-level as its longest path. A tree 280 is illustrated having 9 levels (level 0 through level 8). A processing load is balanced by evenly distributing the data partitions to each server 112 as allocated partitioned data 290.

As watershed computation is applied to river segments regions 210 from upstream to downstream, the river segments are grouped into regions 210 and allocated them over multiple databases. A region contains a binary tree of river segments. The regions 210 themselves also form a tree but not necessarily a binary tree. The partitioning is also made bottom-up from upstream (child) to downstream (parent) of the river, to be consistent with the geographic dependency of hydrologic computation.

The river segments tree is partitioned based on the following criterion. Counted bottom-up in the river segments tree, every sub-tree of a given height forms a region, which is counted from either leaf nodes or the root nodes of its child regions. In order to capture the geographic dependency between regions, the notion of region level is introduced as the partition level of a region that is counted bottom-up from its farthest leaf region, thus represents the length of its longest descendant path on the region tree. As described with reference to FIGS. 2A and 2B, the levels between a pair of parent/child regions may not be consecutive. The computation independence (e.g, parallelizability) of the regions at the same level is statically assured.

A manual or automatic load allocation process may be used to map the data partitions (labeled river regions) to multiple databases and corresponding server nodes 112 to achieve balanced loading. The allocated partitioned data 290 balances the load for each node. As the river regions at the same region level have no geographic dependency they can be processed in parallel. Note that the focus is on static data allocation for all applications, rather than static task partitioning for one particular application.

A Framework for Performing Structured Parallel Data Intensive Computations

Figure 3A:
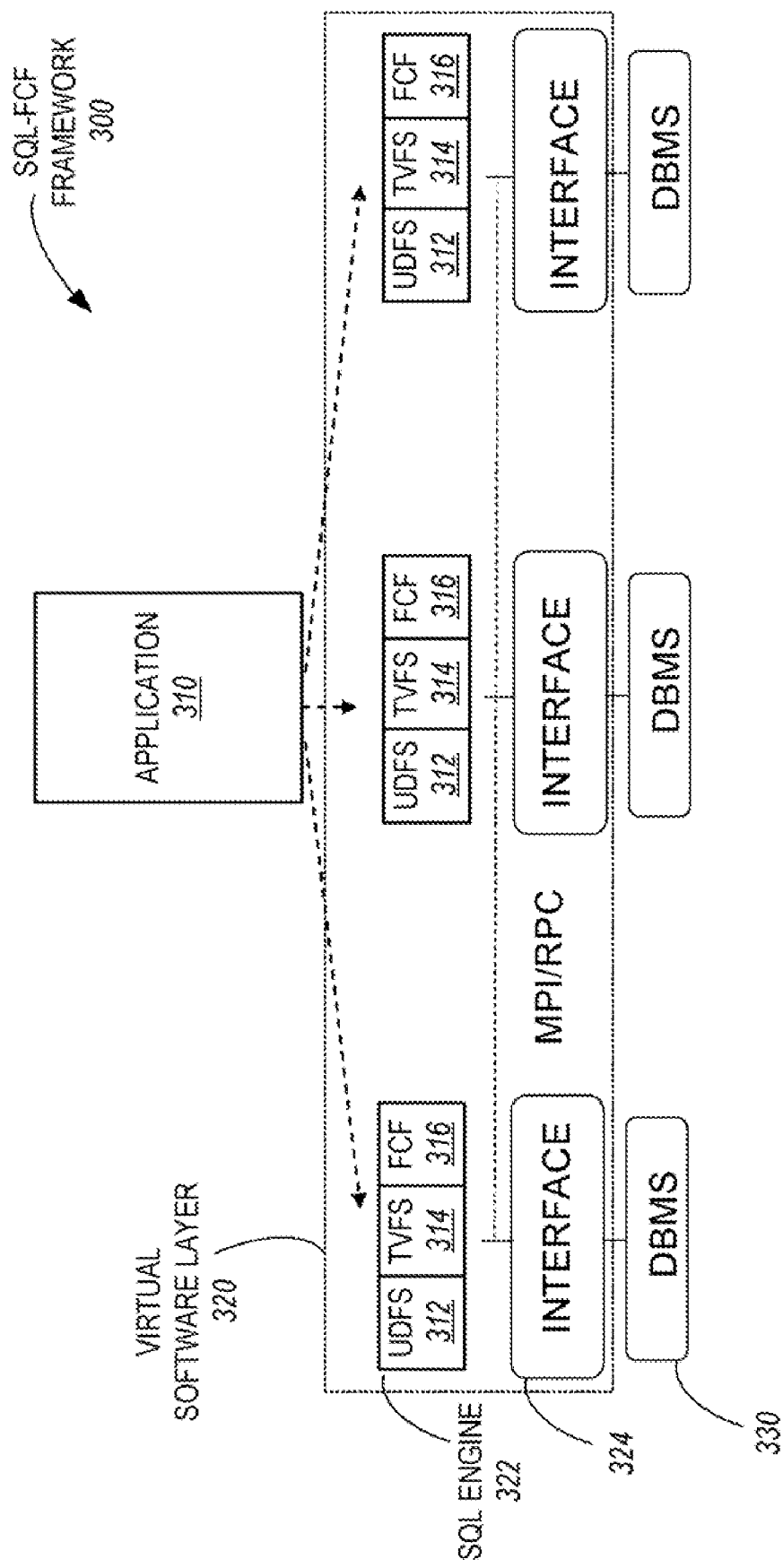
FIG. 3A illustrates a block diagram of a sequence query language—function control forms (SQL-FCF) framework 300, according to an embodiment.

FIG. 3A illustrates a block diagram of a sequence query language—function control forms (SQL-FCF) framework 300, according to an embodiment. The SQL-FCF framework 300 extends the functionality of a basic SQL framework. The SQL-FCF framework 300 provides tools and techniques such as table valued functions (TVFs) 314 and function control forms (FCF) 316 described below to perform database oriented, data intensive, parallel computation in a structured manner.

Specifically, the tools and techniques included in the SQL-FCF framework 300 provide the following functions: 1) Certain procedure semantics is embedded into SQL query statements for expressing how TVFs 314 are applied, in addition to what data are returned, 2) Focused on providing "structured parallel computation" with order dependency in applying TVFs 314 to inter-related objects (compared to the simpler "flat parallel computation" technique applied to multiple independent objects), 3) SQL based FCFs are introduced for expressing the manner to apply a TVF to multiple data objects—in parallel without order dependency, or step by step with specified order dependency, and 4) Extensibility property provides new FCF derived from existing ones using SQL constructs.

The methodology for developing and using the SQL-FCF framework 300 includes: 1) Model application data as relation tables, e.g., row sets. It is assumed that a row, say t, represents a data object, such as a table partition, or the reference of an object with its content fetched inside a function that takes t as its input. 2) Wrap application logic into TVFs 314 for providing a database centric solution, and for pushing down computation to the database layer for reduced data traffic. 3) Associate a TVF with a table (or a row set) T with the input of a TVF being a row in T, and the output being a resulting row set. However the TVF may access and update other information stored in the database. 4) Control the flow of applying a TVF to multiple rows of a table by a FCF. As the framework operates in the SQL context rather than the business process context, applying FCFs 316 does not change the data flow at the relational operator level. 5) Define a FCF as a meta-operator that, applied to a TVF, say $f_T$ defined on table T, denotes a new function on T. The procedure semantics of the new function include the control flow of applying $f_T$ to the rows in T, as well as how the intermediate results may be combined. 6) Manage database update effects of TVFs 314 (follows general principle in using SQL).

An application 310 such as watershed management is pushed down to a lower level to support database oriented, data intensive, and structured parallel computation by wrapping the application 310 as one or more user defined functions (UDFs) 312 (which are well known database objects in the SQL framework) and table valued functions (TVFs) 314. The SQL-FCF framework 300 may be implemented as a virtual software layer (VSL) 320. The VSL 320 layer may include a SQL engine 322 layer and an interface 324 layer to provide the interface between the SQL engine layer 322 and a database management system (DBMS) 330 layer.

The application 310 is coded (or configured) as one or more TVFs 314 whose execution or computation is pushed down to a lower level, e.g., the database management system (DBMS) 330 layer, thereby reducing need for data transfer. The input of a TVF is a row that represents a data partition directly or referentially, and the output is a row set. In addition to conveying an output row set, a TVF may have database update effects, leading to the order sensitivity of its executions. The same TVF included in the TVFs 314 is made available to all the participating server nodes for execution. An example of a TVF used in watershed analysis is described with reference to FIG. 3B.

Referring back to FIG. 3A, moving data is often more expensive and inefficient than moving programs, thus it is desirable that computation be data-driven. The goal of co-locating computation and supporting data may be achieved if data partitioning of the original data and allocation of the data partitions to the computational resources are both driven by a computation model representing the application 310. The DBMS 330 may be configured to include data partitions corresponding to the computations, e.g., the TVFs 314. The TVFs 314 may be applied to corresponding data partitions of the DBMS 330 in a structured order, the structured order being specified by the FCF 316. Specifically, the FCF 316 controls the application of the TVFs 314 to data objects included in the data partitions. Additional details of the FCF 316 are described with reference to FIGS. 4A and 4B.

Referring back to FIG. 3A, the VSL 320, particularly the SQL engine 322 layer, performs the task of interpreting active SQL statements and constructs that may include FCF operators together with the rules for task parallelization. The VSL 320, which is layered above the database management system (DBMS) 330 layer, includes the interface 324 layer to perform function such as invoking the UDFs 312 and TVFs 314 and communicating with the DBMS 330. As described earlier, the SQL-FCF framework 300 is extensible since it provides techniques for defining new FCFs from existing ones with SQL phrases. Additional details of a system architecture that is based on a convergent cluster for implementing the SQL-FCF framework 300 are described with reference to FIG. 6.

FIG. 3B illustrates a procedure for invocating a function, according to an embodiment. The function "watershedanalysis" function 340 is a post-order processing function and 'postorder f' 350 is a TVF that includes a meta operator 'postorder' for applying any function f that processes tree nodes in the post order. Together, (postorder f) denotes a function, where f, which is considered as the operand of postorder, can be substituted by a function, e.g. WatershedAnalysis. The above shows how a meta-operator controls the way of applying a function to data objects, e.g., in parallel, sequential, bottom up tree traversal, and top down tree hierarchy. While meta operator tokens implies the concept of FCF, the SQL based FCFs may be viewed as SQL expressions having richer semantics.

Use of the SQL-FCF framework for User Defined Functions (UDFs) and Table Valued Functions (TVFs)

Referring back to FIGS. 3A and 3B, the basic SQL framework provides fixed features and changeable features. The fixed feature set includes rules and operators such as select, join, project (SJP), order, sort, and others. The changeable features, whose existence is anticipated by the framework but whose particular behavior is not specified by it, include the UDFs.

An enhancement to the changeable parts in the SQL framework is the availability of controlling forms that can be generally used to build new functionalities from existing UDFs. A notable SQL language construct capable of being used when applying the TVFs and the UDFs, is the CROSS APPLY (plus OUTER APPLY) operator provided in Transact-SQL (T-SQL). The construct expresses the manner to apply a TVF to the rows of a table and then union the results. Although the CROSS APPLY primitive may be more powerful than Map-Reduce in representing the "apply-to-all" semantics, in that the input object can be filtered, and output results can be further manipulated by SQL phrases, it is one of the primitives for controlling TVFs. However, the primitive does not indicate the order dependencies in applying TVFs to multiple objects. The FCF 316 included in the SQL-FCF framework 300 provides the order dependency.

In case the set of UDF controlling forms, e.g., the FCFs, are empty, then the behavior of those UDFs may not be extensible. If the set of FCFs is not empty but fixed, then the flexibility of changing the behavior of UDF applications may be still limited. In fact, the set of FCFs determines the capability of the SQL framework for embedding applications. To make such capability extensible, the SQL-FCF framework 300 supports the creation of new FCFs from existing ones with SQL phrases.

A SQL-FCF Framework Application Example in Hydrologic Computation

Referring to FIGS. 1A, 1B, 2A, 2B, 2C, 3A and 3B a watershed monitoring function may be implemented using the following process: Process 1) The function is coded as a user defined TVF, whose execution can be pushed down to the database engine for eliminating the data transfer round trip. Process 2) The TVF, say f, is defined on a river region to conduct a computation for that region. Process 3) The input of f is a region_id, but a small amount of information of the upstream regions may also be required for the computation. Process 4) The output of f is some information as a table or row set, but f may also have effect on database updates which may affect the successive computations. Process 5) The watershed observation function is applied region-by-region from upstream to downstream, e.g., the region tree is post-order traversed—the root being visited last. The parallel computation opportunities exist statically in processing the non-conflict regions at the same level, or the regions without a common parent. Opportunities for execution of computations in parallel also exist dynamically in processing the regions with all their children regions have been processed. These two types of opportunities are interpreted and realized at the VSL 320 layer. Data communication is made through database access.

The following SQL-FCF example illustrates the kind of hydrologic computation jobs applied region-by-region along a geographic region tree in the post-order, which represents the general feature of a class of similar scientific computations. The SQL-FCF shown below controls the "structured" flow of applying a TVF, f, from upstream regions to downstream regions, e.g., bottom-up along the region tree represented in table "regions":

```
CONNECT APPLY f(region_id) TO regions
    BY region_id = PRIOR ALL parent_region_id
    START WITH region_level = 0.
```

This phrase does return a row set, however, different from a recursive query, it also indicates the step of TVF executions, as:

the processing starts from the leaf regions at region_level 0;
the processing is bottom-up, where f is fired on a parent region (in downstream) after all its child regions (in upstream) have been processed;
stepwise parallel computing opportunities are implied for non-dependent function applications.

The unary operator, PRIOR, has the same precedence as the unary add '+' and subtract '−' arithmetic operators. It evaluates the immediately following expression for matching the parent_region_id of ALL child rows with the region_id of the current row, in the order from children to parent. ALL is required as a parent can have multiple children. On TVF executions, the above phrase specifies the post-order traversal order dependency of applying f to multiple regions; on resulting data, it returns the transitive closure of the data hierarchy, plus other designed database effects of f.

Note that the semantics, syntax as well as implementation of this FCF are different from the CONNECT BY primitive. The FCF implementation ensures the order of TVF applications, and a TVF is applied to each data partition (tree node) only once. Similarly, the SQL syntax for CROSS APPLY is also changed as described below.

Core FCF Examples

FIG. 4A Illustrates procedure semantics for a CROSS APPLY primitive applied to a TVF, according to an embodiment. FIG. 4B illustrates procedure semantics for a CONNECT APPLY primitive applied to a TVF, according to an embodiment. Referring to FIGS. 4A and 4B, a FCF, viewed as a "meta operator", takes one or more TVFs as its parameters, applying a FCF to the parameter TVFs, denotes a new function. Two core FCF, e.g., CROSS APPLY 410 and CON- NECT APPLY 420 are described below. Note that this sample set is non-exclusive, and their selection is based on their suitability to SQL semantics.

The procedure semantics of the FCF CROSS APPLY 410 is illustrated in FIG. 4A. The existing CROSS APPLY is modified to be applied with a TVF with syntactical alteration. For a TVF, f, defined on row set R, CROSS APPLY f to R means applying f to all the rows of R, without any constraint on the applying order. The union of the resulting row sets of applying f to each row of R, is joined to R as the return row set.

CROSS APPLY a TVF, f, to a row set R is denoted by $\alpha f_K$: R that returns a row set. Alpha ($\alpha$) denotes the FCF, CROSS APPLY; k denotes the attribute name list, say Ai, . . . , Aj, of R whose values are taken as the function input; $f_K$ maps a row in R to a row set. The procedure semantics of the FCF CONNECT APPLY 420 is illustrated in FIG. 4B. The FCF CONNECT APPLY 420 is used for applying a TVF along the data object hierarchy with order dependency (e.g., due to the TVF's effects on database states). The data objects (or their IDs) to be processed by the TVF are organized in the tree structure, and stored in a table with a pair of parent-child attributes P and C. Accordingly, the parent-child ordering is represented as <P,C>.

Controlled by CONNECT APPLY, the executions start from applying the TVF to the rows selected on a given condition, the order of tree traversal—in pre-order (top-down) or in post-order (bottom-up), is indicated by another input parameter. This FCF specifies both the steps of applying TVF and the returned data, which is the join of the input table and the union of the results from stepwise function applications.

CONNECT APPLY a TVF $f_K$ to a row set R is denoted by $\gamma_{\phi,P,C,o}f_K$: R where $\gamma$ stands for the FCF; k for the input attributes of f, $\phi$ is a condition for selecting the rows in R, e.g., $\sigma_\phi(R)$, to start with. Attributes P and C are the parent-child pair on R, underlying the "connect" condition tparent.C=tchild.P. The ordering of applying is represented by o={0,1} with 0 for "pre-order" and 1 for "post-order".

Deriving New FCF from Existing Ones

Referring to FIGS. 3A, 3B, 4A and 4B, the expressive power of the SQL-FCF framework 300 can be further enhanced by deriving new FCFs from existing ones, by deploying the following two techniques: 1) specializing a FCF, and 2) combining FCFs. With the specialization technique a new FCF can be simply derived from an existing one, say F, by instantiating certain parameters of F. Below is the example of specializing CONNECT APPLY to PREORDER APPLY and POSTORDER APPLY.

In CONNECT APPLY $\gamma_{\phi,P,C,o}f_K$, the apply ordering parameter o={0,1} with 0 for "pre-order" and 1 for "post-order", can be specialized such that $\gamma_{\phi,P,C,0}f_K$ represents PREORDER APPLY, and
$\gamma_{\phi,P,C,1}f_K$ represents POSTORDER APPLY.

These can be illustrated by the following SQL examples:

```
PREORDER APPLY f(region_id) TO regions
  BY parent_region_id, region_id
    START WITH region_level = MAX(region_level);
POSTORDER APPLY f(region_id) TO regions
  BY parent_region_id, region_id START WITH region_level = 0.
```

Interpreted by the above semantics, they are equivalent to:

```
CONNECT APPLY f(region_id) TO regions
  BY PRIOR region_id = parent_region_id
    START WITH region_level = MAX(region_level);
```

```
CONNECT APPLY f(region_id) TO regions
  BY region_id = PRIOR ALL parent_region_id START WITH
    region_level = 0;
``` respectively.

With the combination technique, a FCF can be defined from existing FCFs in the SQL framework that can also be viewed as a special kind of parameterized query. For instance, a new FCF, CONC-CROSS APPLY, can be defined by joining the results of two concurrent cross apply operations, with the following semantics:

[CONC-CROSS APPLY]
  Let $\alpha f_k$ and $\alpha g_k$ be two CROSS APPLY functions defined on R where $f_k$ and $g_k$ have the same input attribute list k on R, such as Ai, . . . , Aj.
  Let the join two row sets R1, R2 on attributes k (e.g., on condition R1.A,=R2.Ai ∧...∧R1.Aj =R2. Aj) be represented by $J_k$ (R1,R2).
  CONC-CROSS APPLY $\alpha f_k$ and $\alpha g_k$ to R means J ($\alpha f_k$:R, $\alpha g_k$:R).

Then in SQL-like syntax, for example,

```
CONC-CROSS APPLY [f(region_id), g(region_id)] TO regions
means
  (CROSS APPLY f(region_id) TO regions) a    JOIN
  (CROSS APPLY g(region_id) TO regions) b    ON a. region_id =
                                               b. region_id.
```

As another example, the following cascade Map-Reduce scheme is described where;
  a map function, mapper1, transforms an input key/value pair (k1,v1) into a list of intermediate key/value pairs [(k2,v2)]. The reduce function is expressed using GROUP BY and SUM in SQL language; it aggregates by SUM the list of values [v2] associated with k2 and produces a list of values (k2,[v3]).
  another Map-Reduce scheme further produces output (k3, [v4])) from (k2,[v3]) by function mapper2, and then aggregates the output values associated with k3 by a reducer that is also based on GROUP BY and SUM.

To implement this scheme in a relational database, an input table R is defined that contains attributes K1, V1, . . . ; two TVFs are defined where mapper1 takes K1 values as input and generates a row set containing attributes K2, V2, . . . ; mapper2 takes K2 values as input and generates a row set containing attributes K3, V4 . . . . Reducers are expressed using GROUP BY and SUM. With the SQL-FCF syntax, this cascade Map-Reduce scheme can be expressed as

```
SELECT K3, SUM(V4) FROM
  (CROSS APPLY mapper2(K2) TO
    (SELECT K2, SUM(V2) FROM (CROSS APPLY mapper1(K1) TO R)
       GROUP BY K2)
  )
  GROUP BY K3.
```

One may define for this a specific FCF:

```
MR-MR APPLY (f2(K2), f1(K1)) TO R
Then a query may be expressed as
SELECT * FROM (MR-MR APPLY (mapper2(K2), mapper1(K1)) TO R).
```

Methods for Processing Structured Parallel Data Intensive Computations

Figure 5A:
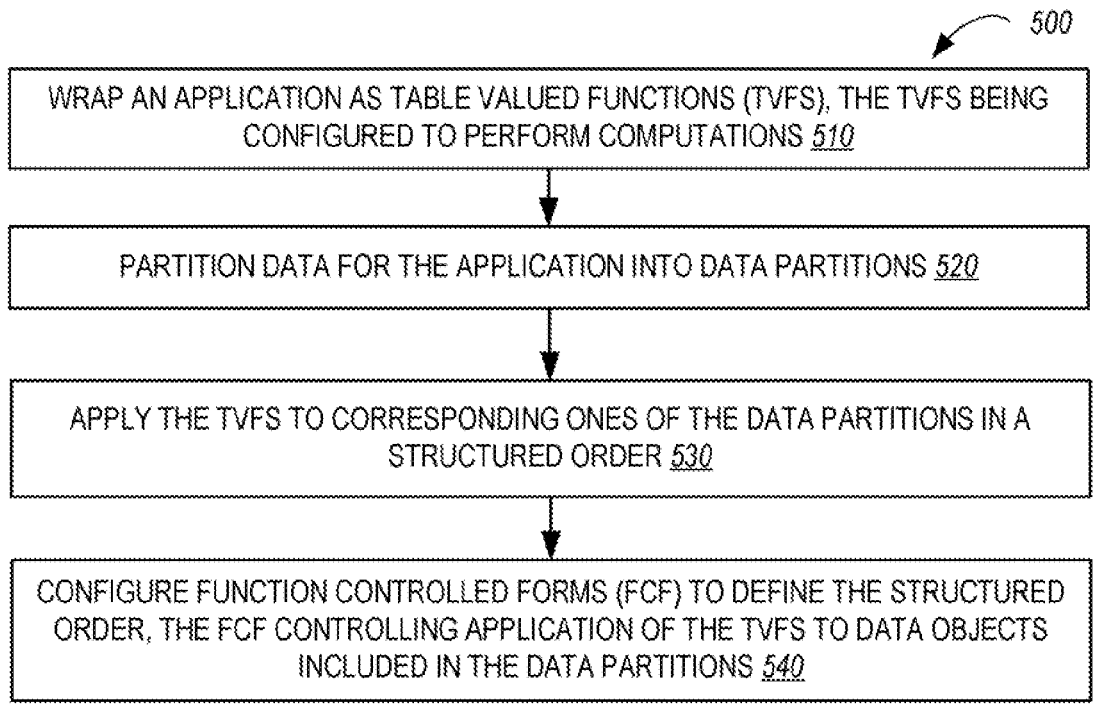
FIG. 5 illustrates a flow chart of a method for processing structured parallel data intensive computations, according to an embodiment.

FIG. 5A illustrates a flow chart of a method 500 for processing structured parallel data intensive computations, according to an embodiment. In a particular embodiment, the method 500 is used for generating and using a SQL-FCF framework described with reference to FIGS. 3A, 3B, 4A, and 4B to process the structured parallel data intensive computations.

At process 510, an application is wrapped as table valued functions (TVFs), the TVFs being configured to perform computations. For example, logic or rules associated with the application may be coded as one or more TVFs. At process 520, data for the application is partitioned into data partitions, At process 530, the TVFs are applied to corresponding ones of the data partitions in a structured order.

Figure 5B:
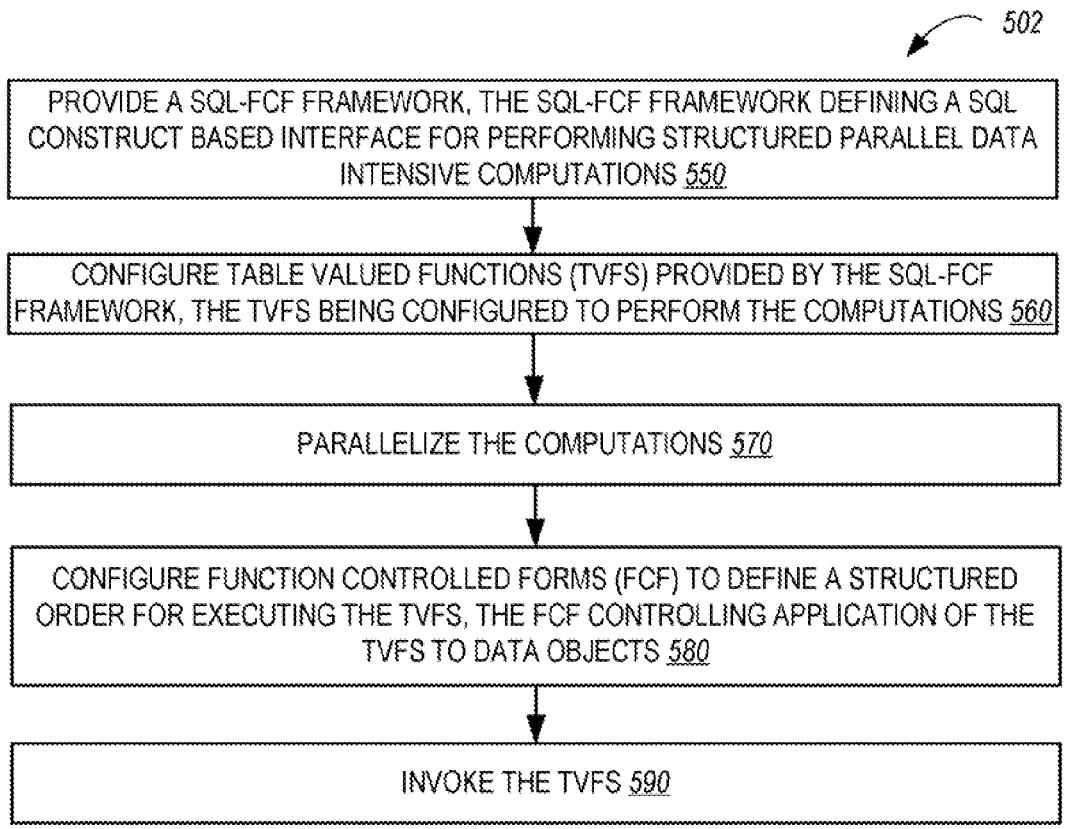

FIG. 5B illustrates a flow chart of a method 502 for using a SQL-FCF framework to execute structured parallel data intensive computations, according to an embodiment. In a particular embodiment, the method 502 is used for using a SQL-FCF framework described with reference to FIGS. 3A, 3B, 4A, and 4B to execute the structured parallel data intensive computations.

At process 550, a SQL-FCF framework is provided, the SQL-FCF framework defining a SQL construct based interface for performing structured parallel data intensive computations. At process 560, table valued functions (TVFs) provided by the SQL-FCF framework are configured, the TVFs being configured to perform the computations. At process 570, the computations are parallelized to evenly distribute the load. At process 580, function control forms (FCF) are configured to define a structured order for executing the TVFs, the FCF controlling application of the TVFs to data objects. At process 590, the TVFs are invoked.

With reference to the methods 500 and 502, it is understood, that various steps described above may be added, omitted, combined, altered, or performed in different order. For example, in the method 500, process 540 may be added to configure function control forms (FCF) to define the structured order, the FCF controlling application of the TVFs to data objects included in the data partitions. As another example, in the method 500, another process may be added to construct the FCF as a meta operator for applying a function f to perform at least one of the computations, f being an operand of the meta operator, the meta operator using the function f as a parameter for applying f.

Implementation Considerations

Architecture Based on a Convergent Cluster

Figure 6:
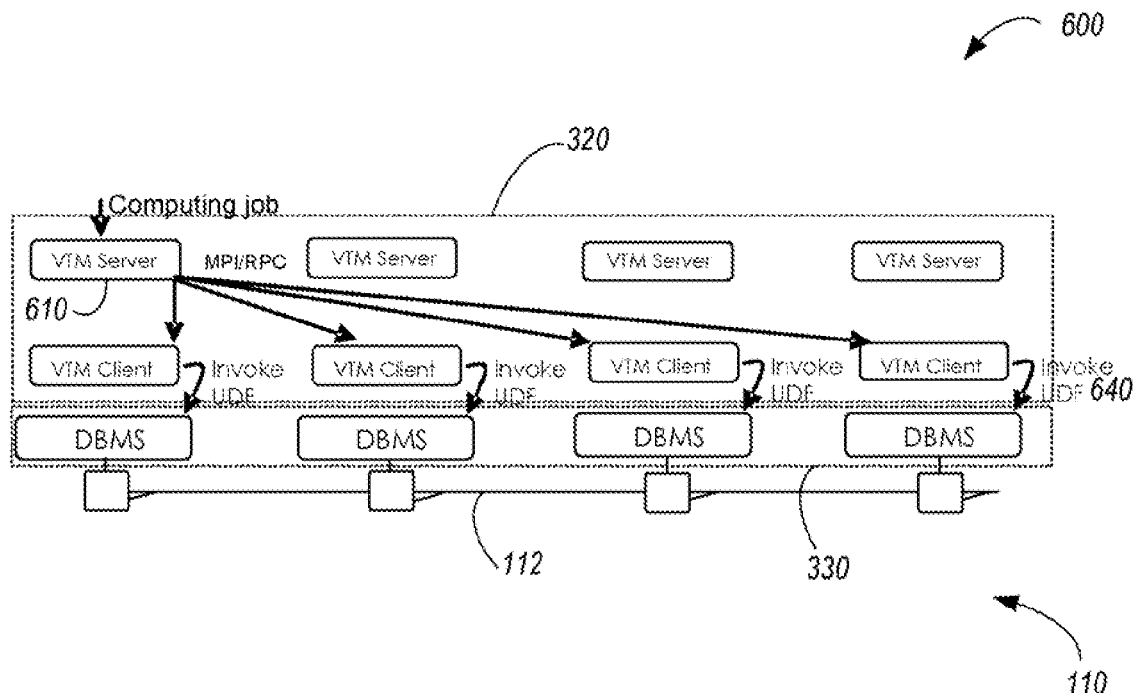
FIG. 6 illustrates a system architecture based on a convergent cluster for implementing a SQL-FCF framework described with reference to FIGS. 3A and 3B, according to an embodiment.

FIG. 6 illustrates a system architecture 600 based on a convergent cluster for implementing a SQL-FCF framework described with reference to FIGS. 3A and 3B, according to an embodiment. The cluster platforms of parallel data management and parallel computing may be converged, for shared resource utilization, for reduced data movement between database and applications, and for mutually optimized performance.

For parallel data management, implementation options may include a selection between using a parallel database or multiple individual databases, with the latter being selected for the watershed application. As described with reference to FIG. 1B, a single cluster of server machines for both parallel data management and parallel computing may be selected for implementation. The cluster of servers 110 may contain N nodes (for e.g., N=4, 16, 128, 256, . . . ) interconnected by high-bandwidth communication network 112. The clustered server nodes 110 may execute individual share-nothing relational DBMS 330; data are partitioned to multiple databases based on their domain specific properties, allowing the data access throughput to increase linearly along with the increase of server nodes. The server nodes 110 form one or more cliques in data accessing, allowing a data partition to be visible to multiple nodes, and a node to access multiple data partitions. This arrangement is desired for simplifying inter-node messaging and for tolerating faults (as described above, the computation on a region may need to retrieve the updated information of the root nodes of its child regions).

The computation functions may be implemented as database user defined functions (UDFs) 312 and TVFs 314 for co-locating data intensive computation and data management.

While employing multiple server nodes and executing multiple DBMSs, the convergent cluster architecture offers application a single system image transparent to data partitioning and execution parallelization. This may be accomplished by building the Virtual Software Layer (VSL) 320 on top of DBMS 330 that provides Virtual Data Management (VDM) for dealing with data access from multiple underlying databases, and Virtual Task Management (VTM) 610 for handling task partition and scheduling.

In the current design, the VSL 320 resides at each server node, all server nodes are treated equally: every server node holds partitions of data, as well as the meta-data describing data partitioning; has VDM capability as well as VTM 610 capability. The locations of data partitions and function executions are consistent but transparent from applications.

Task Scheduling

The parallel computation opportunities exist statically in processing the geographically independent regions either at the same level or not, and dynamically in processing the regions with all their children regions have been processed. These two kinds of opportunities will be interpreted and realized by the system layer.

The computation functions, e.g., UDFs 312 and TVFs 314 are made available on all the server nodes. The participating server nodes also know the partition of regions and their locations, the connectivity of regions, particular computation models, UDF settings and default values. Further, each VTM is provided with a UDF/TVF invoker 640 and an ODBC connector.

A computation job can be task-partitioned among multiple server nodes to be executed in parallel. Task scheduling is data-driven, based on the locality and geo-dependency of the statically partitioned data. UDFs 312 and TVFs 314 are scheduled to run at the server nodes where the applied data partitions reside. Local execution results are stored in databases, and communicated through database access. The computation results from multiple server nodes may be assembled if necessary.

In more detail, task scheduling is based on the master-slave architecture. Each server node can act as either master or slave, and can have both of them.

The VTM-master is responsible for scheduling tasks based on the location of data partitions, their processing dependencies, and the execution status. It determines the parallel processing opportunities for the UDF and TVF applications without static and dynamic dependencies, send task requests together with parameters to the VTM-slaves where the data to be computed on reside, monitors execution status, re-executes tasks upon failure, etc. Currently, the resembling of local results is handled directly by the VTM-master module.

Upon receipt of task execution requests and parameters from the VTM-master, the VTM-slaves execute their tasks through UDF/TVF invokers 640.

For messaging, the MPI/RPC protocol may be utilized where VTM master and slaves serve as MPI masters and slaves. Although the data from master to slave may include static inputs associated with a new region, processes on different regions pass information through database access.

In summary, the SQL-FCF framework 300 provides a database centric solution by pushing down data intensive computation to the database layer for reduced data traffic, and by wrapping computation tasks as UDFs and TVFs, and control their applications to data objects.

The SQL-FCF framework 300 supports TVF Controlling Forms (FCFs) into the SQL framework. The framework describes a process to systematically and imperatively embed certain flow control on UDF applications into SQL query statements (rather than scripts), in a way integrated with the data flows in query processing. With this extension, applying TVFs can be controlled in a way consistent with the dependency of data processing, such as the post-order tree traversal illustrated herein, implied by the nature of the applications.

The FCF 316 along with the embedded corresponding procedural semantics to SQL provides a database centric solution to process data dependent, structured parallel computing. A sample set of core FCF is provided for controlling the operational flow of applying TVFs to data partitions. The mechanisms for FCF extensibility are provided, allowing new FCFs to be defined from existing ones with SQL phrases.

Figure 7:
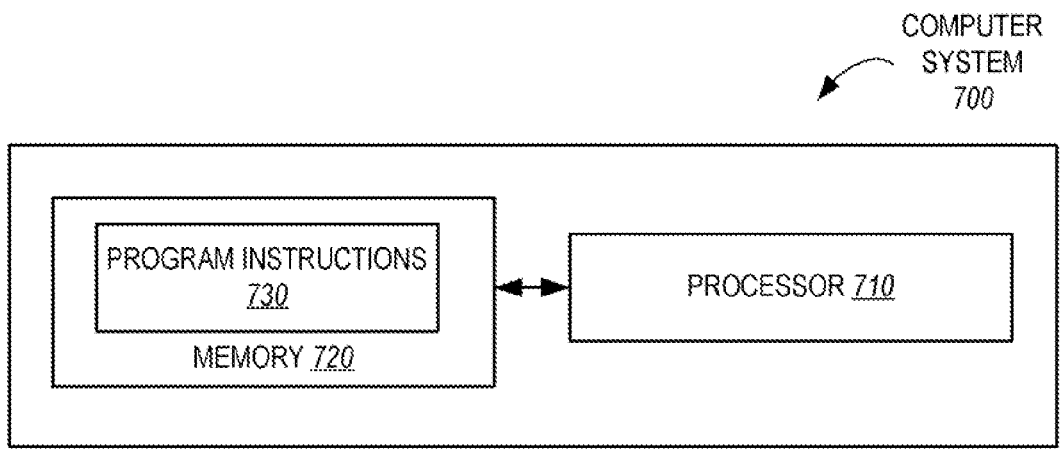
FIG. 7 illustrates a block diagram of a computer system, according to an embodiment.

FIG. 7 illustrates a block diagram of a computer system 700, according to an embodiment. The computer system 700 includes a processor 710 coupled to a memory 720. The memory 720 is operable to store program instructions 730 that are executable by the processor 710 to perform one or more functions. It should be understood that the term "computer system" is intended to encompass any device having a processor that is capable of executing program instructions from a computer-readable medium such as memory devices and storage devices. In a particular embodiment, the various functions, processes, methods 500 and 502, the SQL-FCF framework 300, and operations described herein may be implemented using the computer system 700. For example, the river drainage network model 100 and components thereof e.g., the cluster of servers 110, may be implemented as program instructions 730 using one or more of the computer system 700.

The various functions, processes, methods, and operations performed or executed by the system 700 can be implemented as the program instructions 730 (also referred to as software or simply programs) on computer readable medium that are executable by the processor 710 and various types of computer processors, controllers, microcontrollers, central processing units, microprocessors, digital signal processors, state machines, programmable logic arrays, and the like. In an exemplary, non-depicted embodiment, the computer system 700 may be networked (using wired or wireless networks) with other computer systems.

In various embodiments the program instructions 730 may be implemented in various ways, including procedure-based techniques, component-based techniques, object-oriented techniques, rule-based techniques, among others. The program instructions 730 can be stored on the memory 720 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a watershed computation application is described. It is understood that the methods and systems described herein may be applied in all parallel processing applications. The illustrative techniques may be used with any suitable data processing configuration and with any suitable servers, computers, and devices. In the claims, unless otherwise indicated the article "a" is to refer to "one or more than one".

What is claimed is:

1. A computer system comprising:
   a computer processor; and
   logic instructions on tangible computer readable media and executable by the computer processor to cause the computer processor to:
   wrap an application as table valued functions (TVFs), the TVFs being configured to perform computations;
   partition data for the application into data partitions;
   apply the TVFs to corresponding ones of the data partitions in a structured order.

2. The system of claim 1, the logic instructions further causing the computer processor to:
   configure function control forms (FCF) to define the structured order, the FCF controlling application of the TVFs to data objects included in the data partitions.

3. The system of claim 2, the logic instructions further causing the computer processor to:
   form new ones of the FCF from existing ones of the FCF using SQL constructs, thereby making the FCF extensible.

4. The system of claim 2, the logic instructions further causing the computer processor to:
   construct the FCF as a meta operator for applying a function f to perform at least one of the computations, f being an operand of the meta operator, the meta operator using the function f as a parameter for applying f.

5. The system of claim 2, the logic instructions further causing the computer processor to:
define the FCF to include a primitive CONNECT APPLY to apply a function of the TVFs in the structured order and a primitive CROSS APPLY to apply another function of the TVFs without the structured order.

6. The system of claim 1, the logic instructions further causing the computer processor to:
allocate the data partitions and corresponding ones of the TVFs to co-locate computation and data.

7. The system of claim 1, the logic instructions further causing the computer processor to: parallelize the data partitions and the corresponding ones of the TVFs across server nodes.

8. The system of claim 1, the logic instructions further causing the computer processor to:
configure a data dependency graph to define the structured order.

9. The system of claim 1, the logic instructions further causing the computer processor to:
apply at least one function configured in the TVFs to data objects included in the corresponding ones of the data partitions.

10. The system of claim 1, the logic instructions further causing the computer processor to:
update the data in response to applying the TVFs to corresponding ones of the data partitions.

11. The system of claim 1, the logic instructions further causing the computer processor to:
configure an input of one of the TVFs as a row representing one of the data partitions and an output of the one of the TVFs as a row set.

12. The system of claim 1, the logic instructions further causing the computer processor to:
perform the computations at a database layer.

13. The system of claim 1, the logic instructions further causing the computer processor to:
configure the structured order to be a reversed tree.

14. A computer system comprising:
a computer processor; and
logic instructions on tangible computer readable media and executable by the computer processor to cause the computer processor to:
represent a particular application with a number of table valued functions (TVFs), the TVFs being configured to perform computations corresponding to functionality of said particular application;
partition data to be processed by the application into data partitions;
apply the TVFs to corresponding ones of the data partitions in a structured order.

15. The system of claim 14, the logic instructions further causing the computer processor to:
configure function control forms (FCF) to define the structured order, the FCF controlling application of the TVFs to data objects included in the data partitions.

16. The system of claim 14, the logic instructions further causing the computer processor to:
allocate the data partitions and corresponding ones of the TVFs to co-locate computation and data.

17. The system of claim 16, the logic instructions further causing the computer processor to:
configure an input of one of the TVFs as a row representing one of the data partitions and an output of the one of the TVFs as a row set.

18. The system of claim 1, the logic instructions further causing the computer processor to:
perform the computations at a database layer.

* * * * *